United States Patent [19]

Pien

[11] Patent Number: 5,072,699

[45] Date of Patent: Dec. 17, 1991

[54] INTERNAL COMBUSTION ENGINE

[76] Inventor: Pao C. Pien, 1105 Marbelle Club, 840 S. Collier Blvd., Marco Island, Fla. 33937

[21] Appl. No.: 468,286

[22] Filed: Jan. 22, 1990

Related U.S. Application Data

[63] Continuation-in-part of Ser. No. 381,286, Jul. 18, 1989, abandoned, which is a continuation-in-part of Ser. No. 182,956, Apr. 18, 1988, abandoned.

[51] Int. Cl.⁵ .................................................. F02B 25/08
[52] U.S. Cl. .......................... 123/65 VC; 123/65 P; 123/73 PP; 123/73 V; 123/73 DA; 123/90.15; 123/196 R
[58] Field of Search ................ 123/73 V, 73 C, 65 P, 123/48 R, 90.31, 90.15, 90.27, 73 PP, 65 VC, 73 DA, 74 AE, 196 R, 73 PP, 65 VD

[56] References Cited

U.S. PATENT DOCUMENTS

| | | | |
|---|---|---|---|
| 2,216,083 | 9/1940 | Leser et al. | 123/65 VC |
| 2,552,006 | 5/1951 | Gill | 123/65 VC |
| 2,946,324 | 7/1960 | Casini | 123/73 DA |
| 3,441,009 | 4/1969 | Rafanelli | 123/90.15 |
| 3,683,875 | 8/1972 | Chadwick | 123/90.15 |
| 3,929,111 | 12/1975 | Turner et al. | 123/73 R |
| 4,362,132 | 12/1982 | Neuman | 123/73 DA |
| 4,879,974 | 11/1989 | Alvers | 123/73 PP |

FOREIGN PATENT DOCUMENTS

| | | | |
|---|---|---|---|
| 2523211 | 9/1983 | France | 123/65 VC |
| 2115485 | 9/1983 | United Kingdom | 123/73 B |
| 8707325 | 12/1987 | World Int. Prop. O. | 123/65 VC |

*Primary Examiner*—David A. Okonsky
*Attorney, Agent, or Firm*—Roy W. Butrum

[57] ABSTRACT

A cylinder block includes a cylinder with a piston therein and a main crankcase. A combustion space is disposed above the piston and a compression space is disposed below the piston. An exterior passage including a reservoir transfers compressed air from the compression space to the combustion space. A first valve permits one-way flow of ambient air into the compression space, and a second valve permits one-way flow from the compression space into the passage so that the compression process is independent of the combustion process. In one embodiment, the exterior passage includes a first passage for air and a second passage for fuel-air mixture for selective communication with the combustion chamber. In another embodiment, an inner crankcase is disposed within and spaced from the main crankcase and incorporates the first and second valves.

20 Claims, 6 Drawing Sheets

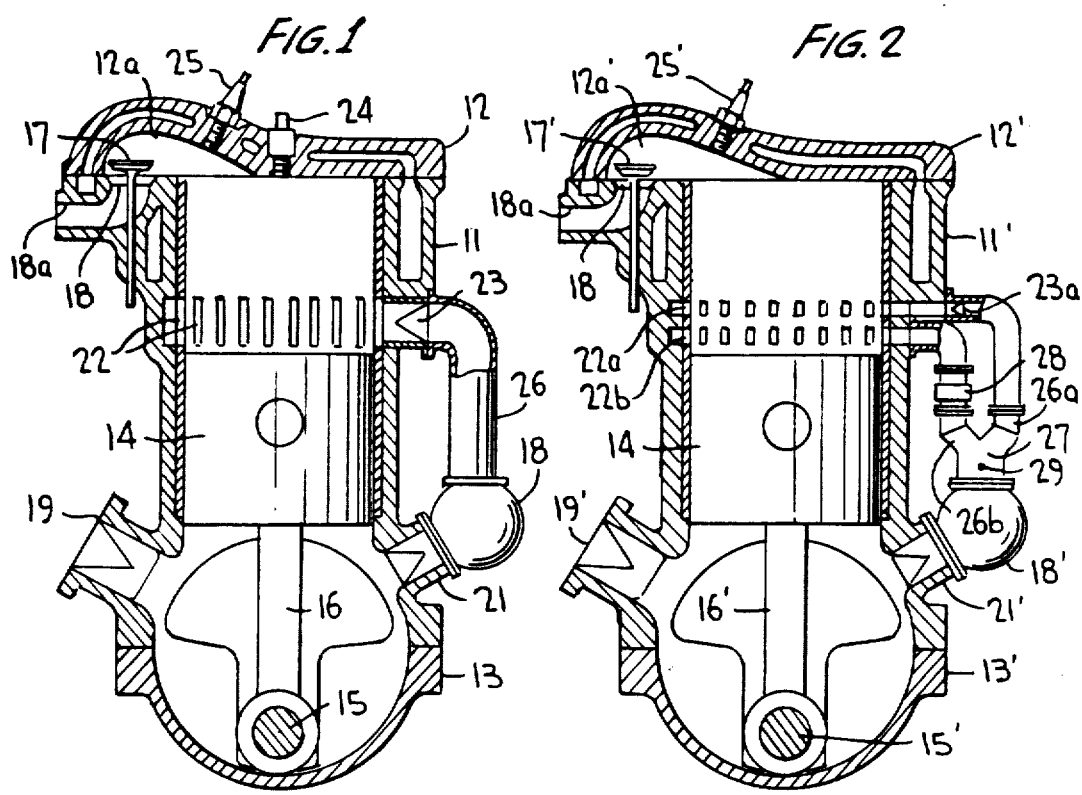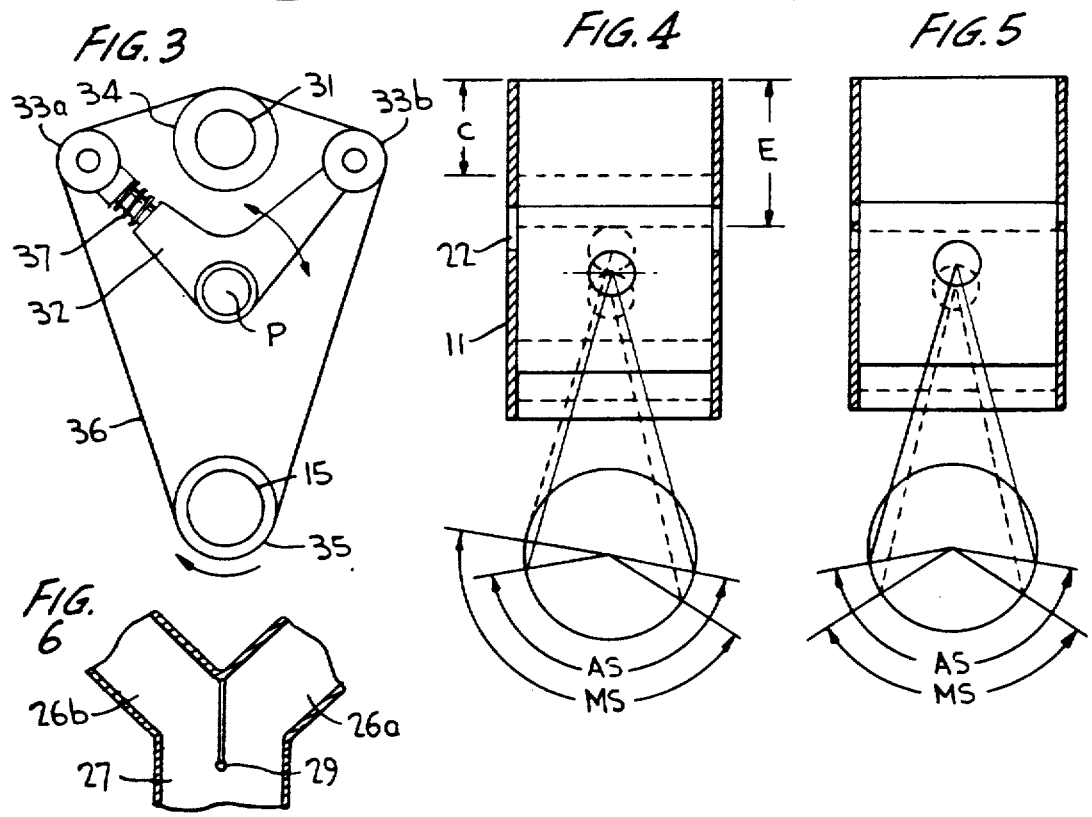

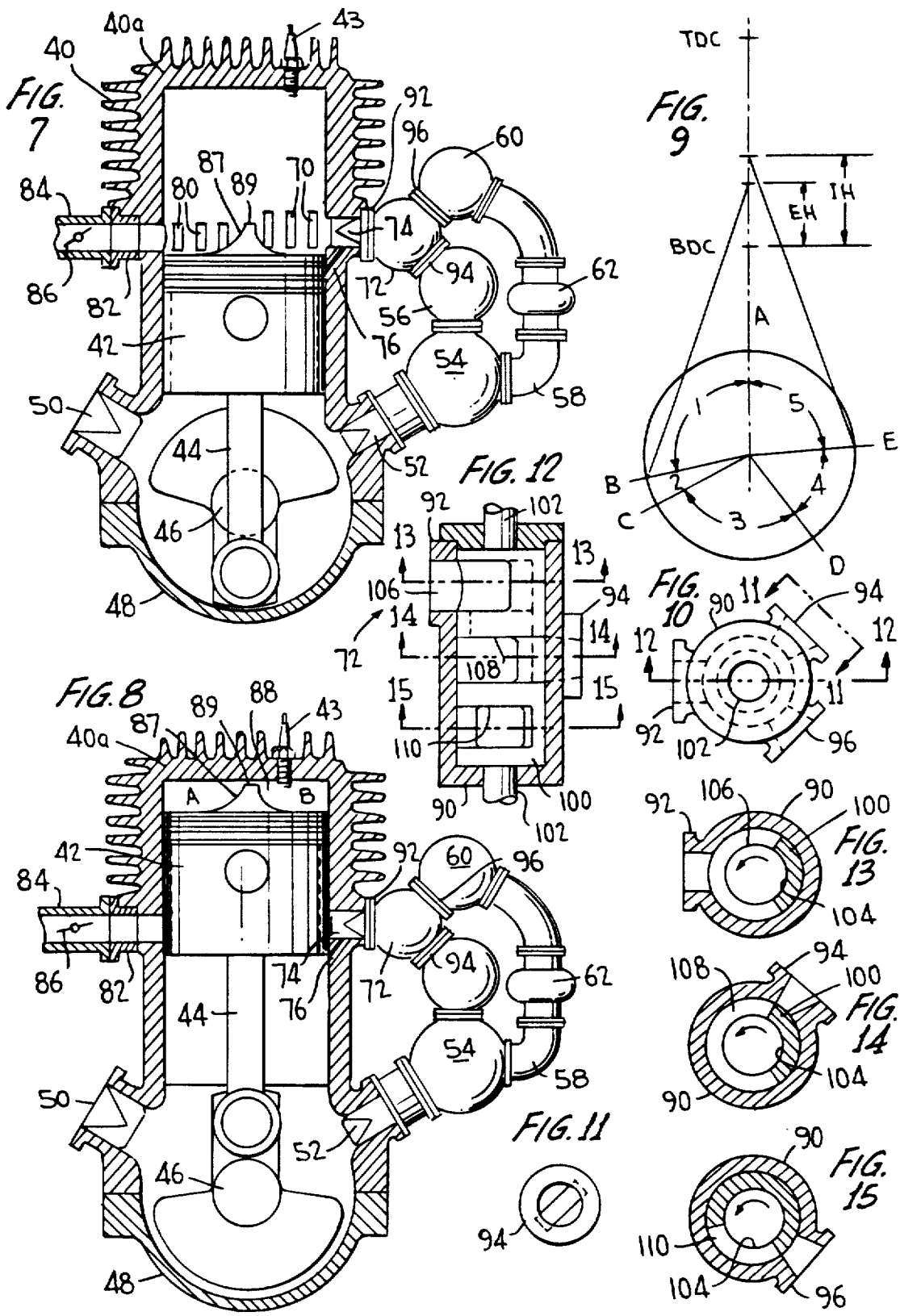

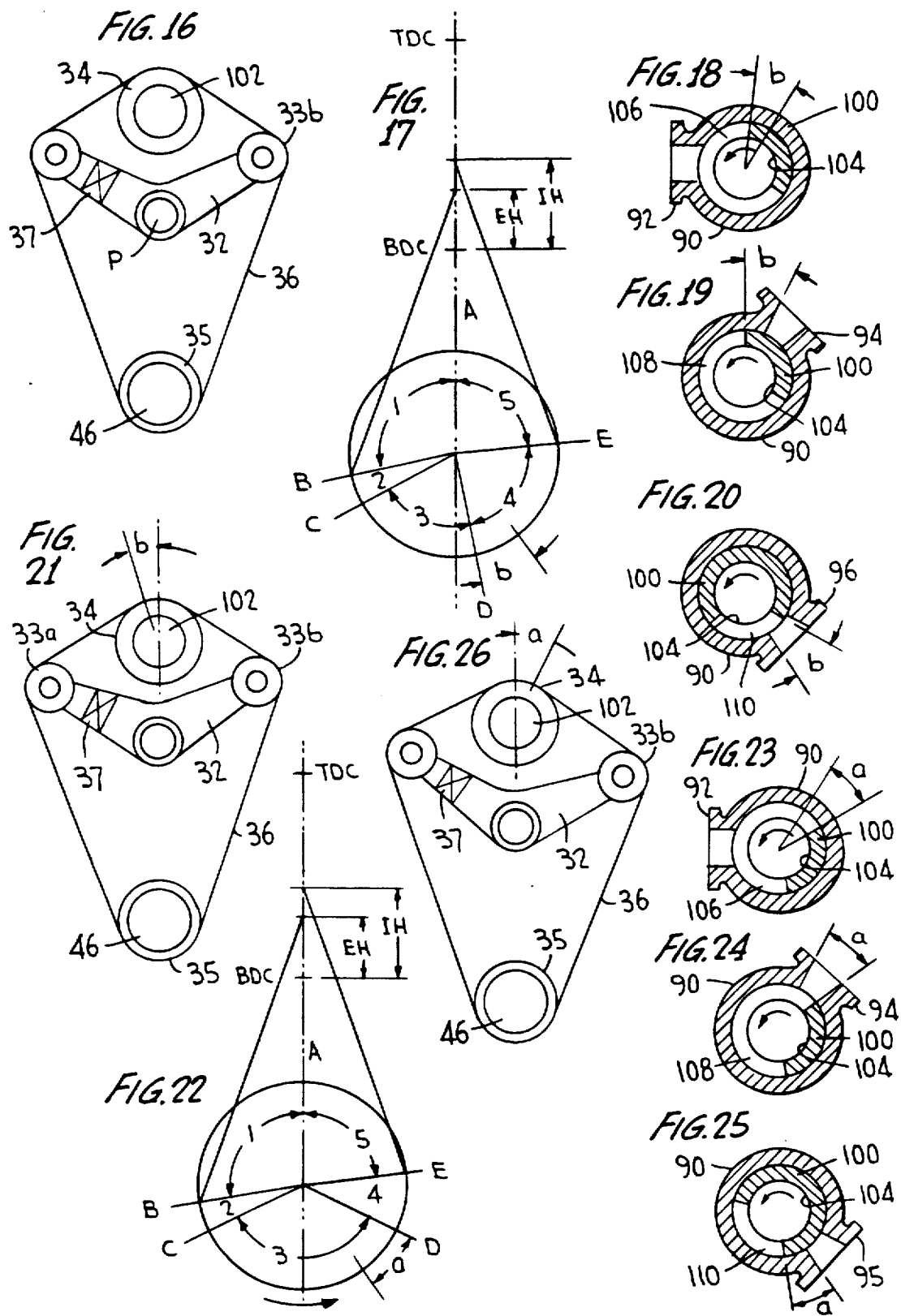

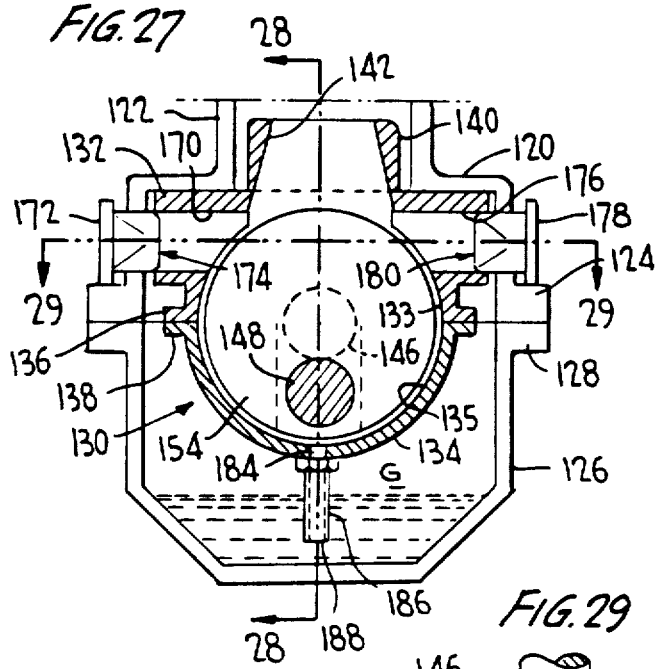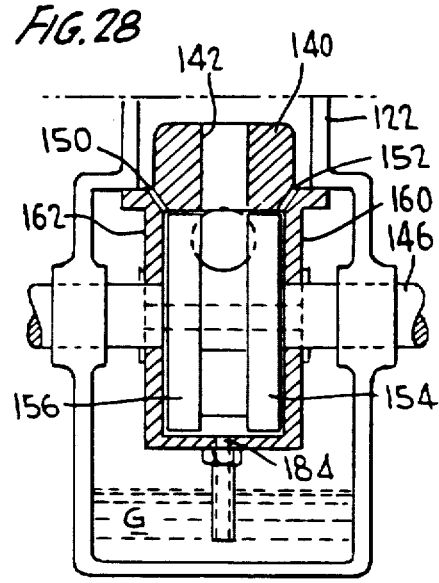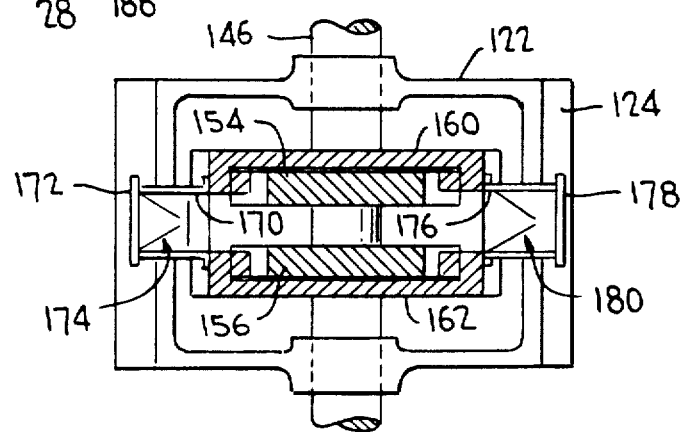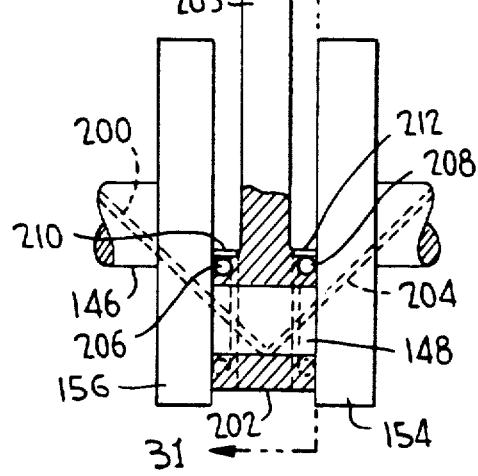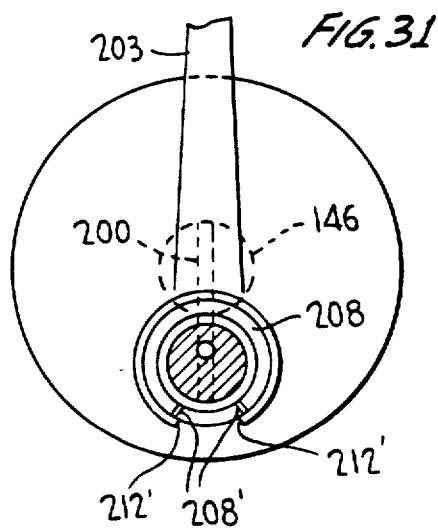

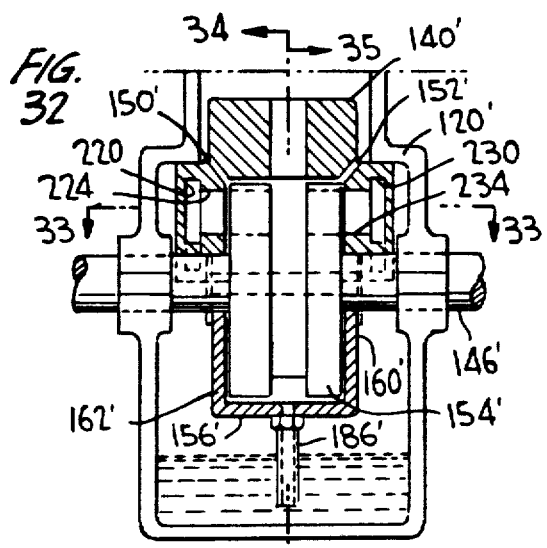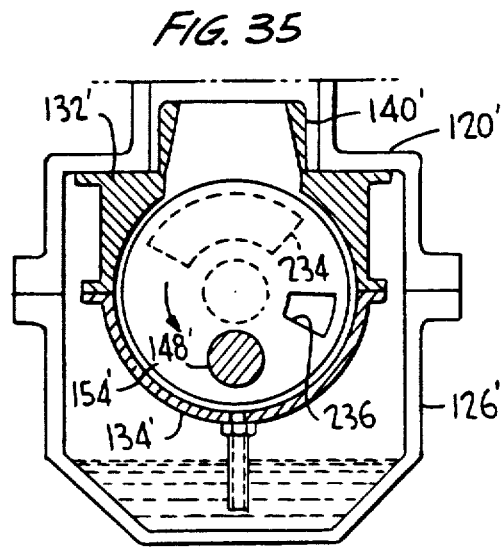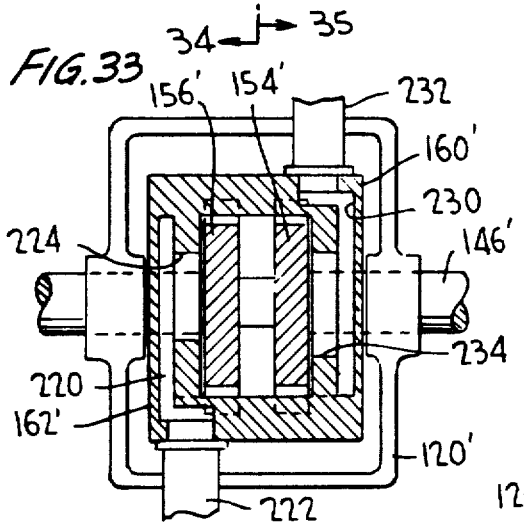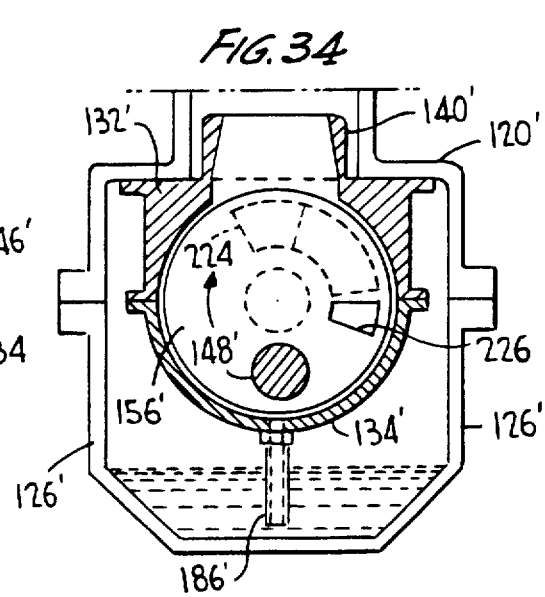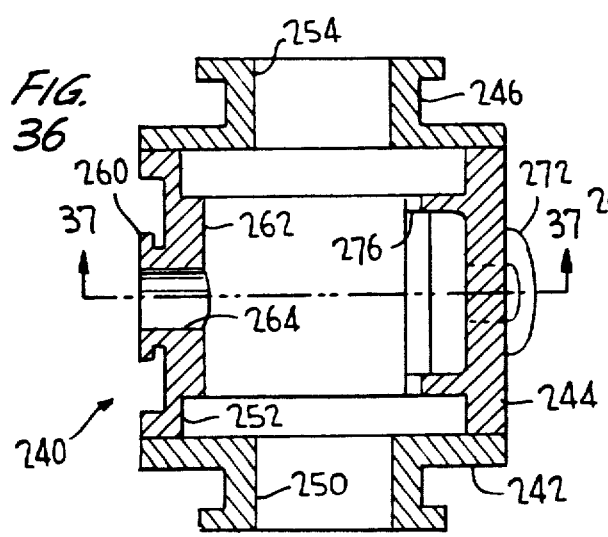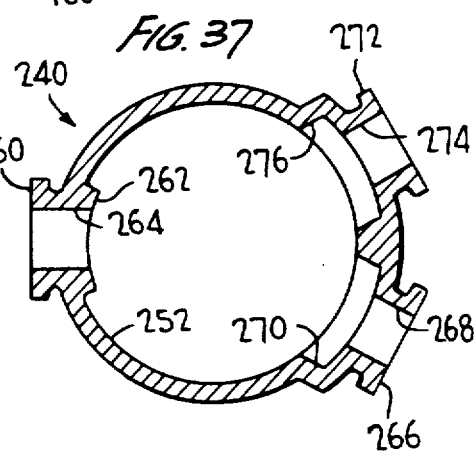

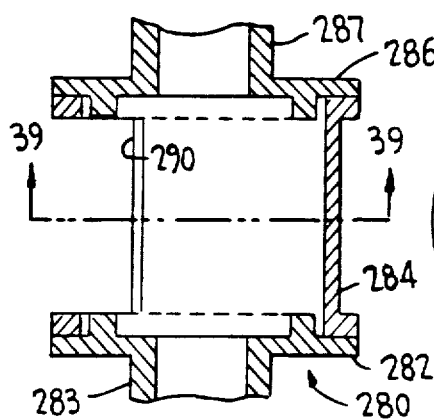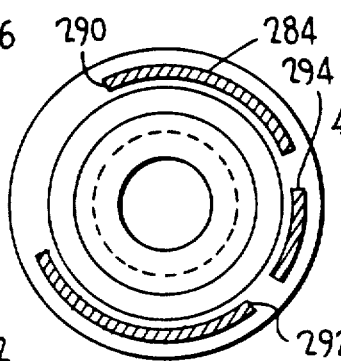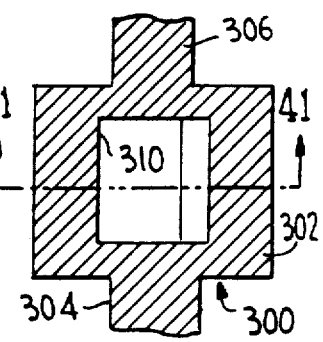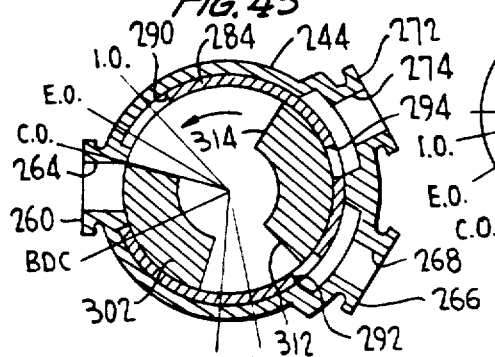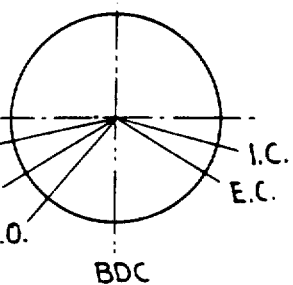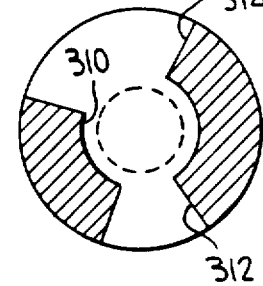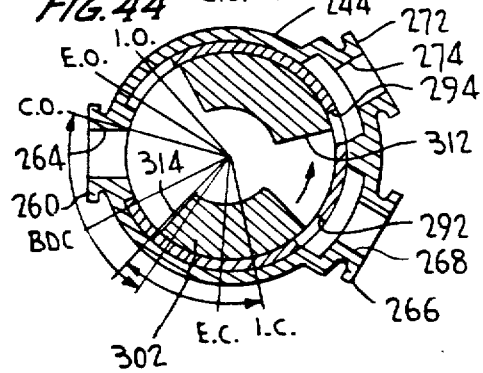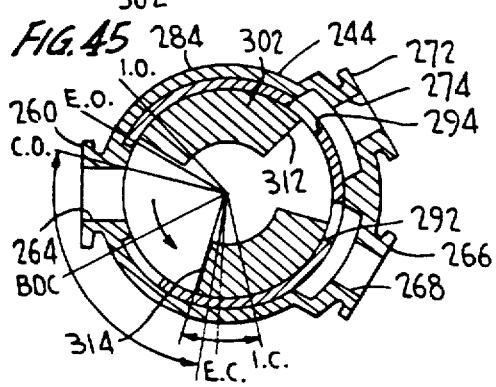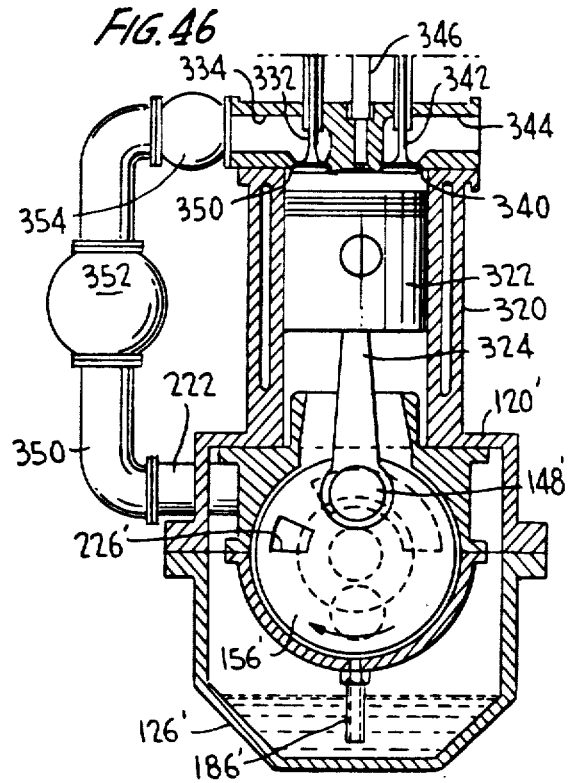

INTERNAL COMBUSTION ENGINE

CROSS-REFERENCE TO RELATED APPLICATION

This is a continuation-in-part of application Ser. No. 381,286, filed July 18, 1989, which in turn was a continuation-in-part of application Ser. No. 182,956, filed Apr. 18, 1988, both abandoned.

BACKGROUND OF THE INVENTION

The present invention relates to internal combustion engines of the type wherein the piston comprises the movable part of a pump or compressor for supplying air to the combustion space of a cylinder of the engine. Such engines may be fueled by carburetor means or fuel injection means.

Known two-cycle engines of this type have a number of drawbacks. A principal problem is the fact that high torque is obtainable only over a limited rpm range. As a result, when used in an automotive vehicle or the like, an inordinate amount of shifting of the associated transmission is required to maintain a high torque output under varying conditions of operation.

Known two-cycle engines exhibit an impulse scavenging which exhibits varying pressure during scavenging, whereas a constant pressure scavenging would be desirable. Furthermore, these known engines have a low scavenging ratio, whereas a high scavenging ratio is very desirable. Such engines employing carburetors suffer objectionable fuel-air mixture loss during the scavenging process of the operating cycle. Additionally, the fuel-air mixture provided to the cylinders of such engines may not be homogeneous. A simple carburetor does not satisfactorily meet the engine requirements during transient operation. The pressure within the cylinders of such engines is not constant at the beginning of the compression stroke as is desirable, but varies according to engine loading. Additionally, in these known engines, the expansion process is of fixed duration, whereas it would be desirable to vary or extend this expansion process.

The clearance volume of the compressor of known engines is excessive, and it is desirable to reduce such clearance volume to a minimum. Additionally, it would be highly advantageous to avoid or minimize direct contact between the compressed air and lubrication oil which may be within the crankcase.

SUMMARY OF THE INVENTION

The invention may be employed either with two-cycle or four-cycle internal combustion engines. In the invention construction, the output of the compression space of the compressor is connected with the combustion space of the cylinder in such a manner that the compression space is effectively isolated from the combustion space; and accordingly the compression process within the compression space of the crankcase is substantially independent of the processes occurring within the combustion space of the cylinder. This enables the design of the compressor and the compression space to be made independently of the design of the cylinder and the combustion space.

Some forms of the invention incorporate a crankcase compressor wherein the lower part of the cylinder below the piston is in full communication with the crankcase, and a pair of valve means are supported for direct communication with the interior of the crankcase for providing ambient air to the crankcase and for providing compressed air to other portions of the engine.

In modified forms of the invention, an inner crankcase is provided adjacent the lower end of the cylinder and is spaced from the conventional crankcase of the engine. This inner crankcase has a hollow interior which is shaped to conform to the shape of the crankshaft to reduce the clearance therewith. The inner crankcase includes an upwardly extending portion which is received within the recess beneath the piston defined by a depending skirt or flange on the periphery of the piston. The upwardly extending portion has an opening therethrough which receives the connecting rod in its various positions with a minimum clearance. The construction of the inner crankcase greatly reduces the clearance volume of the compressor.

The inner crankcase forms of the invention are also provided with a forced lubrication system wherein oil under pressure is provided to the crankpin bearing within the inner crankcase. Oil leaking from the crankpin bearing is directed downwardly and drained from the inner crankcase to minimize direct contact between compressed air and lubrication oil.

The valve means for controlling the flow of ambient air into the compression space and the flow of compressed air out of the compression space toward the combustion space may comprise conventional one-way reed valves. In a modified form of the invention employing an inner crankcase, crank cheeks of the crankshaft and the inner crankcase are provided with openings adapted to register with one another to provide the desired flow control while operating with improved reliability and less maintenance than conventional reed valves.

Means exterior of the cylinder and crankcase is provided for receiving compressed air from the compression space and providing a source of compressed air to the combustion space. This exterior means provides a substantially constant scavenging pressure. This exterior means should have a volume substantially greater than the engine displacement, and preferably at least about one and one-half times the engine displacement. In a single cylinder engine, the intake manifold may be designed to serve this function. In a multiple cylinder engine or in a single cylinder four-cycle engine, a separate reservoir means may be employed to provide the desired volume and a substantially constant pressure of compressed air supplied to the combustion space of the engine.

A means for creating a combustible fuel-air mixture in the combustion space may comprise either a fuel injector or a carburetor, especially a "simple" carburetor as is well-known in the carburetor art.

Control means is provided for controlling the speed and torque of the engine. One form of control means includes an adjusting means which is interconnected with the crankshaft. The adjusting means enables an operator to control the scavenging timing of the operating cycle of the engine, thereby controlling the speed and torque of the engine. In particular, the timing of the air scavenging and fuel-air scavenging portions of the operating cycle of the engine may be controlled while minimizing the loss of fuel-air mixture during the scavenging process.

A modified form of control means eliminates the adjusting means interconnected with the crankshaft. This modified control means includes a pair of movable control means one of which may be adjusted to various positions to increase or decrease the duration of the air and fuel-air scavenging processes to control the engine speed or torque.

A substantially homogeneous fuel-air mixture is provided to all cylinders of a multi-cylinder engine, and the requirements of transient operation are met while employing a simple carburetor. A substantially constant pressure is provided within the cylinder at the beginning of the compression process regardless of engine loading. The expansion process may also be varied or extended.

The expansion and compression ratios of the engine may be readily varied, and a scavenging ratio much greater than unity may be obtained. Additionally, the peak pressure in the compression space is reduced to improve the work function of the compressor.

With the construction of the present invention, high torque is obtainable from the engine over a wide rpm range, thereby greatly reducing the need for shifting of an associated transmission under varying conditions of operation.

BRIEF DESCRIPTION OF THE DRAWINGS

FIG. 1 is a cross-section through one cylinder of an engine showing the piston at bottom dead center position;

FIG. 2 is a view similar to FIG. 1 of a modified form of the invention;

FIG. 3 is a schematic illustration of the adjusting mechanism of the control means of the invention;

FIG. 4 is a diagram illustrating the crank angles for equal and unequal compression and expansion ratios;

FIG. 5 is a diagram illustrating the crank angle for air scavenging and the crank angle for air-fuel mixture scavenging;

FIG. 6 is an enlarged cross-sectional view of a portion of the structure shown in FIG. 2;

FIG. 7 is a cross-section through one cylinder of a further form of the invention showing the piston at bottom dead center position;

FIG. 8 is a view similar to FIG. 7 showing the piston at top dead center position;

FIG. 9 is a crank angle diagram illustrating one cycle of operation of the engine;

FIG. 10 is a top view of flow control means of the invention;

FIG. 11 is a view taken along line 11—11 of FIG. 10 looking in the direction of the arrows;

FIG. 12 is a longitudinal section taken along line 12—12 of FIG. 10 looking in the direction of the arrows;

FIG. 13 is a sectional view taken along line 13—13 of FIG. 12 looking in the direction of the arrows;

FIG. 14 is a sectional view taken along line 14—14 of FIG. 12 looking in the direction of the arrows;

FIG. 15 is a sectional view taken along line 15—15 of FIG. 12 looking in the direction of the arrows:

FIG. 16 shows the adjusting mechanism of FIG. 3 in its neutral position which will cause the components shown in FIGS. 13-15 to be in the position illustrated therein;

FIGS. 17, 18, 19, 20 and 21 are similar to FIGS. 9, 13, 14, 15 and 16 respectively, and illustrate the components in the position where the timing of the control means is advanced to admit more fuel-air mixture;

FIGS. 22, 23, 24, 25 and 26 are similar to FIGS. 17, 18, 19, 20 and 21 respectively, and illustrate the components in the position where the timing of the control means is retarded to admit less fuel-air mixture;

FIG. 27 is a cross-section through the lower part of one cylinder of a modified form of the invention with the connecting rod eliminated for the sake of clarity;

FIG. 28 is a sectional view taken along line 28—28 of FIG. 27 looking in the direction of the arrows;

FIG. 29 is a sectional view taken along lines 29—29 of FIG. 27 looking in the direction of the arrows;

FIG. 30 is a view, partially cut away, of a portion of the crankshaft and connecting rod connected therewith of the modification shown in FIGS. 27-29;

FIG. 31 is a sectional view taken along line 31—31 of FIG. 30 looking in the direction of the arrows;

FIG. 32 is a cross-section through the lower part of one cylinder of a further modified form of the invention with the connecting rod eliminated for the sake of clarity;

FIG. 33 is a sectional view taken along line 33—33 of FIG. 32 looking in the direction of the arrows;

FIG. 34 is a sectional view taken along line 34—34 of FIG. 32 looking in the direction of the arrows;

FIG. 35 is a sectional view taken along line 35—35 of FIG. 32 looking in the direction of the arrows;

FIG. 36 is a longitudinal section through a body means of a modified control means;

FIG. 37 is a sectional view taken along line 37—37 of FIG. 36 looking in the direction of the arrows;

FIG. 38 is a longitudinal section through an annular control means of the modified control means;

FIG. 39 is a sectional view taken along line 39—39 of FIG. 38 looking in the direction of the arrows;

FIG. 40 is a longitudinal section through a rotating control means of the modified control means;

FIG. 41 is a sectional view taken along line 41—41 of FIG. 40 looking in the direction of the arrows;

FIG. 42 is a crank angle diagram illustrating the angles at which certain events occur during operation of an engine;

FIG. 43 is a cross-section through the assembled modified control means illustrating one limit position of the annular control means and a first position of the rotating control means;

FIG. 44 is a view similar to FIG. 43 showing the control means in a different position;

FIG. 45 is a view similar to FIG. 43 illustrating the opposite limit position of the annular control means and a further position of the rotating control means; and FIG. 46 is a longitudinal section through one cylinder of a four-cycle diesel engine according to the invention.

DESCRIPTION OF THE PREFERRED EMBODIMENTS

Referring now to the drawings wherein like reference characters denote corresponding parts throughout the several views, a first form of the invention is shown in FIG. 1 wherein the engine comprises a cylinder block including a cylinder 11 having a cylinder head 12 mounted thereon. A crankcase 13 is mounted at the lower side of the cylinder opposite the cylinder head. A piston 14 is mounted for reciprocation within the cylinder and is connected to crankshaft 15 by means of a connecting rod 16 in the usual manner. The crankshaft is journalled in the crankcase for rotation therein. In this form of the invention, needle bearings may be used for the crankpin bearings of the crankshaft. The piston cooperates with the cylinder to define an expansible/compressible combustion space above the piston; and the piston also forms the top of a compression space below the piston.

The crankcase is substantially hermetically sealed with respect to ambient atmosphere, and as illustrated is sealed with respect to the engine block. When there are two or more cylinders, it is necessary to seal the crankcase portion of each cylinder with respect to the crankcase portion of the other cylinders.

An exhaust valve 17 is supported in the cylinder head for opening and closing outlet port means 17a in communication with an exhaust means 17b which may be part of an exhaust manifold. The cylinder head is configured to define a chamber 12a which forms part of the combustion space and is designed to enhance the mixing of the fuel-air mixture with air in the combustion space.

Means 18 exterior of the cylinder and crankcase is provided for receiving compressed air from the compression space. Means 18 may take the form of a reservoir for receiving and storing compressed air. In a typical example, the volume of means 18 should comprise at least about one and one-half times the engine displacement which equals the total piston displacement of the engine. The pressure within the reservoir may be about 1 ½ atmospheres which can vary according to the back pressure of the exhaust system. A first one-way valve means 19 is mounted in the wall of the crankcase, this valve means being in communication with ambient atmosphere and permitting air flow into the compression space, but substantially preventing any air flow out of the compression space into ambient air. A second one-way valve means 21 is mounted in the wall of the crankcase, this valve means permitting air flow out of the compression space and into means 18, but substantially preventing any air flow back into the compression space. These one-way valve means may comprise conventional reed valves or the like.

Inlet port means 22 comprises a plurality of circumferentially spaced port means formed in the cylinder wall and being in communication with the hollow interior of the cylinder. These inlet port means are connected with means 18 by a conduit 26. A further one-way valve means 23 is disposed in the cylinder wall at the outer end of conduit 26 to prevent combustion gases from flowing from the cylinder back into conduit 26 and means 18. It will be noted that means 18 and conduit 26 form passage means exterior of the cylinder block for transferring gaseous material from the compression space to the combustion space. The piston skirt-to-crown height is such that the inlet port means is exposed only when the piston is disposed near bottom dead center position of the piston as shown in FIG. 1.

A significant feature of the invention is the one-way valve means arrangement which ensures that the compression process within the compression space is substantially independent of the processes occurring in the combustion space. This structure enables the compressor to be designed independently of the design of the combustion space of the engine.

Means 24 in the form of a conventional fuel injector is mounted in the cylinder head and cooperates with the air introduced into the combustion space by the exterior passage means for creating a combustible fuel-air mixture in the combustion space. Ignition means 25 in the form of a conventional spark plug is also mounted in the cylinder head for igniting the fuel-air mixture in the combustion space. The fuel injector may, of course, be eliminated, and a conventional carburetor may be connected in conduit 26 for providing the fuel-air mixture in a well-known manner.

The embodiment of FIG. 1 has been illustrated as a single cylinder. It is apparent that the engine may be in fact a single cylinder engine, but in most instances the engine will comprise two or more cylinders. In such a case, means 18 is common to all of the cylinders and will be connected by conduit 26 to an intake manifold which in turn is in communication with all of the cylinders. Each cylinder will be provided with a separate valve means 23. In addition, each compression space will be connected through a separate valve means 21 with means 18.

Referring now to FIG. 2 of the drawings, a modified form of the invention is illustrated. This engine is similar in some respects to that shown in FIG. 1, and corresponding parts are indicated with the same reference numerals primed. The inlet port means in this form of the invention comprises an upper row 22a of circumferentially spaced port means and a lower substantially parallel row 22b of circumferentially spaced port means. The passage means in this embodiment of the invention includes a first passage means in the form of a conduit 26a connected between means 18' and the upper row of port means 22a. A second passage means in the form of a conduit 26b is connected between means 18' and the lower row of port means 22b. A Y-connector 27 is connected between means 18' and conduits 26a and 26b. As seen in FIG. 6, a deflector valve 29 is swingably mounted within the Y-connector for proportioning the flow of air between means 18 and passages 26a and 26b.

A one-way valve 23a similar to valve 23 of the device shown in FIG. 1 is provided between the upper row of port means 22a and the outer end of conduit 26a. A conventional carburetor means 28 is connected in conduit 26b to provide a fuel-air mixture to the combustion space. A conventional means (not shown) may be provided for controlling the air flow to the compression space through one-way valve 19', thereby controlling the speed and torque of the engine.

Here again, while the embodiment of FIG. 2 is illustrated as a single cylinder, the engine will in most instances comprise two or more cylinders. In such a case, means 18' and means 28 are common to all of the cylinders. Conduit 26a will be connected to an upper intake manifold which in turn will be in communication with the upper row of inlet port means 22a of all of the cylinders. Each cylinder will be provided with a separate valve means 23a between the upper intake manifold and the inlet port means 22a. Conduit 26b will be connected to a lower intake manifold which will be in communication with the lower row of inlet port means 22b of all of the cylinders. In addition, each crankcase portion will be hermetically sealed from the other crankcase portions and each crankcase portion will be connected through a separate valve means 21' with means 18'.

In the embodiment of FIG. 2, the piston in its downward stroke first uncovers the upper row of inlet port means 22a which allows the scavenging process to begin as soon as the exhaust valve 17' opens and the resulting blowdown drops the cylinder pressure below the pressure in means 18'. As the piston continues its stroke, it uncovers the lower row of inlet port means 22b which allows air from means 18' to pass through carburetor means 28 into the cylinder beneath the scavenging air to provide the fuel charge to the cylinder. This arrangement ensures that the scavenging air entering through inlet port means 22a forms a barrier layer between the fuel-air mixture and the exhaust valve 17', thereby preventing or greatly limiting any loss of fuel through the exhaust valve.

FIG. 3 diagrammatically illustrates the control means 5 which comprises an adjusting means for controlling the speed and torque of the engine. This adjusting mechanism is of well-known construction and is employed with the structures shown in FIGS. 1 and 2 for controlling the timing of the opening and closing of the exhaust valve 17 or 17'. This mechanism includes a rocking frame 32 which may be operated by any suitable device such as a foot pedal in the case of an automotive vehicle and the like. The rocking frame carries idler sprockets 33a and 33b mounted on the arms of the rocking frame and having a biasing spring 37 in one arm to maintain the tension of a timing belt or chain 36.

A drive sprocket 35 is connected to the crankshaft 15, and a sprocket 34 is mounted on a camshaft 31 which is operatively connected with the exhaust valve 17 or 17'. The timing chain is operatively engaged with each of the sprockets during operation. The position of the rocking frame 32 may be adjusted to change the phase angle between the camshaft and the crankshaft by pivoting the rocking frame in one direction or the other about its fixed pivot point P.

In the case of a multi-cylinder engine, the adjusting means is common to and interconnected with the exhaust valves of all of the cylinders so that the timing of the opening and closing of the exhaust valves of all the cylinders may be adjusted in unison.

Referring now to FIG. 4, this diagram illustrates the angular positions of the connecting rod as solid lines when the opening and closing of exhaust valve 17 is symmetrical about the dead center position of the crankshaft which provides equal compression and expansion ratios. The dotted line positions of the connecting rod shows the effect of delaying the closing of exhaust valve 17 to reduce the compression ratio and the delaying of the opening of valve 17 to increase the expansion ratio. In this figure, C represents the compression process portion of the reciprocating movement of the piston, and E represents the expansion process portion thereof. The letters AS in this figure indicate the air scavenging portion of the cycle of operation of the engine.

Referring now to FIG. 5, this diagram illustrates the crankshaft angle during air scavenging AS, and the crankshaft angle during fuel-air mixture scavenging MS. These angles differ since the air only scavenging takes place during the time when inlet port means 22a are open, while the fuel-air mixture scavenging takes place only during the time that the inlet port means 22b are open.

In the embodiments of FIGS. 1 and 2, the control means shown in FIG. 3 may be employed to selectively vary the phase angle between the camshaft which operates the exhaust valves and the crankshaft over a range of values. This causes a variation in the timing of the opening and closing of the exhaust valves to thereby vary the compression ratio with respect to the expansion ratio. The compression ratio is defined as the cylinder volume at the beginning of the compression process divided by the cylinder clearance volume. The expansion ratio is defined as the cylinder volume at the end of the expansion process divided by the cylinder clearance volume. The scavenging ratio is defined as the compressor displacement volume times the compressor volumetric efficiency divided by the cylinder volume at the beginning of the compression process.

If the opening and closing of the exhaust valve is symmetrical with respect to the dead center crank angle of the crankshaft, the compression period and the expansion period are equal. If the opening and closing of the exhaust valve is delayed, the expansion period becomes longer than the compression period. If the opening and closing of the exhaust valve is advanced, the compression period starts earlier in the cycle and more air is trapped within the cylinder for a higher maximum engine output.

The engines shown in FIGS. 1 and 2 operate efficiently under a variety of conditions. In operation, the expansion process takes place following the combustion process and provides the force to drive the piston 14 downwardly from the top dead center position of the piston to the bottom dead center position thereof at the end of the stroke. During this process, the piston conveys the power of the expanding gases to the crankshaft through the connecting rod and at the same time compresses the air present below the piston.

As the pressure in the compression space exceeds the pressure in means 18 or 18', the air moves through one-way valve means 21 or 21', and the air cannot flow back into the compression space. The air is replenished in the compression space from ambient atmosphere through one-way valve means 19 or 19' as the piston moves upwardly from its bottom dead center position.

As the piston approaches the position in which the inlet ports 22 are uncovered near the end of the expansion process, the exhaust valve 17 or 17' opens to begin the blowdown process. As soon as the pressure in the cylinder is lower than that in means 18 or 18', the scavenging process begins and continues until the valve 17 or 17' or the inlet ports are closed. During the scavenging process, compressed air from means 18 or 18' flushes the combustion gases out through the open exhaust valve.

As the valve 17 or 17' closes, the charge of air in the cylinder has a pressure equal to the pressure in means 18 or 18' which is greater than atmospheric pressure and the pressure due to the flow resistance in the exhaust system of the engine, thus providing a charge of air of greater density than that obtainable from atmospheric pressure alone. In effect, there is a degree of supercharging. Means 18 or 18' ensures that the air or fuel-air mixture charge provided to the cylinder is at a substantially constant pressure.

In the construction shown in FIG. 1, as exhaust valve 17 closes, the piston 14 moves to close the inlet port means and the fuel injector means 25 is activated at the appropriate time to create a combustible fuel-air mixture in the combustion space. In the modification shown in FIG. 2, the carburetor means 28 is activated to produce a combustible fuel-air mixture in the combustion space. In both of these forms of the invention, the spark plug means 25 ignites the fuel-air mixture. In a diesel configuration, a high pressure nozzle is used to inject fuel into the high pressure and high temperature air in the cylinder at the end of the compression process and combustion is initiated without the need of a separate ignition means.

Referring now to FIGS. 7 and 8 of the drawings, a further form of the invention is shown wherein a cylinder block includes a cylinder 40 having a cylinder head 40a and a hollow interior within which a piston 42 is mounted for reciprocation. The piston is of conventional construction and includes a peripheral depending skirt as indicated by dotted lines 42' which defines a recess under the piston. A spark plug 43 is mounted in the cylinder head. A connecting rod 44 connects the piston with crankshaft 46 in the usual manner. The crankshaft is journalled in a crankcase 48 for rotation therewithin. As in the previous forms of the invention, the crankcase is hermetically sealed, and in a multi-cylinder engine, the crankcase portion associated with each cylinder is hermetically sealed with respect to each of the other crankcase portions.

The piston cooperates with the cylinder to form an expansible/compressible combustion space above the piston; and the piston also forms the top of a compression space below the piston. A first one-way valve means 50 is mounted in the wall of the crankcase and permits the flow of ambient air into the compression space, but substantially prevents the flow of air out of the compression space. A second one-way valve means 52 is also mounted in a wall of the crankcase and permits flow of compressed air out of the compression space, but substantially prevents flow of air back into the compression space.

Means 54 which may be a reservoir is connected with the output of valve means 52 to receive and store compressed air therewithin. Means 54 is in communication with a first intake manifold 56 which provides a first passage means for flow of compressed air from the compression space to the combustion space. A conduit 58 comprises second passage means and connects means 54 with a second intake manifold 60. A simple carburetor means 62 is connected in conduit 58 so as to provide a fuel-air mixture to manifold 60.

A row of circumferentially spaced inlet port means 70 is formed in the cylinder wall throughout approximately one-half the circumference thereof, these port means being in communication with the first and second intake manifolds through a flow control means 72 hereinafter described. A third one-way valve means 74 is mounted in the cylinder wall between the inlet port means and the flow control means 72 and permits flow from manifolds 60 and 56 into the cylinder, but prevents back flow from the cylinder into means 54. A small passage 76 formed in the cylinder wall connects an intermediate space between the inlet port means 70 and one-way valve means 74 with the compression space only when the piston is near its top dead center position, for a purpose hereinafter described.

A row of circumferentially spaced outlet port means 80 is formed in the cylinder wall throughout approximately the remaining one-half of the circumference thereof. It will be noted that the inlet port means 70 extend further toward the cylinder head 40a than the outlet port means so that upon movement of the piston toward the cylinder head, the outlet port means will be closed before the inlet port means.

Exhaust means includes an exhaust manifold 82 in communication with the exhaust port means 80 and connected with an exhaust conduit 84. A further valve means 86 is connected in the exhaust means and is movable from an open position toward a closed position wherein the pressure within the combustion space increases.

As seen in FIGS. 7 and 8, the skirt to crown height of the piston is such that the inlet and the outlet port means is exposed only near bottom dead center position of the piston. Additionally, the upper face of the piston has portions 87 and 88 sloping upwardly to a ridge 89 which extends generally radially of the piston to provide a desired path of loop scavenging and which divides the combustion space into two parts when the piston is at top dead center position.

Referring now to FIG. 9, as an example, a crank angle diagram is illustrated showing various engine cycle events. Starting from top dead center position as indicated by letter A, sector 1 represents the expansion process, and letter B indicates the crank angle at which the exhaust port means 80 opens. Sector 2 is the blowdown period, and letter C indicates the crank angle at which the one-way valve means 74 opens. Sector 3 represents the air scavenging process, and sector 4 represents the fuel-air mixture scavenging process. Letter D indicates the crank angle at which the flow control means shifts from air scavenging to fuel-air mixture scavenging. Letter E indicates the crank angle at which inlet port means 70 are closed.

For a given amount of fuel to be introduced into the cylinder, the richer the fuel-air mixture, the shorter the fuel-air mixture scavenging requirement. Within the limits of the richest fuel-air mixture which can be properly produced by a carburetor means, the fuel-air mixture scavenging duration should be kept to a minimum to reduce the overlap between opening of the exhaust port means and the admission of fuel-air mixture for scavenging so that the fuel loss during the scavenging process can be kept negligible.

Referring now to FIGS. 10-15, the details of construction of the flow control means 72 are illustrated. A hollow housing 90 has three flanges 92, 94 and 96 formed integral therewith, flanges 94 and 96 having bores formed therethrough which are generally circular at the outer ends of the bores and which taper inwardly to substantially rectangular configurations at the inner ends of the bores as seen in FIG. 11. This rectangular configuration allows the bores to be opened and closed off in a quick and effective manner. Flange 92 has a cylindrical bore formed therethrough.

Flange 92 is connected with the cylinder such that the bore formed therein is in communication with the inlet port means 70. Flange 94 is connected with intake manifold 60 so that the bore formed therein is in communication with means 54 and carburetor means 62. Flange 96 is connected with intake manifold 56 so that the bore formed therein is in communication with means 54.

A cylindrical body 100 is rotatably supported within housing 90 for rotation in a counter-clockwise direction as indicated by the arrows in FIGS. 13-15 and has flow control shaft portions 102 fixed thereto and rotatably extending through opposite ends of housing 90. Body 100 has a cylindrical cavity 104 therewithin and three substantially parallel peripherally extending openings 106, 108 and 110 spaced from one another along the length of the body. These openings extend through different arcs of the cylindrical body 100 as seen in FIGS. 13, 14 and 15 so as to provide communication in a predetermined sequence between the inlet port means connected with flange 92 and the inlet manifolds 56 and 60 connected with flanges 94 and 96 respectively.

It should be understood that in a multi-cylinder engine, there is a flow control means 72 for each cylinder, and all of the flow control means are connected to a common flow control shaft 102 driven by the crankshaft through a chain. The duration of the fuel-air mixture scavenging can be varied by shifting the phase angle between the flow control shaft and the crankshaft by means of the adjusting mechanism shown in FIG. 16. This adjusting mechanism is identical to that previously described in connection with FIG. 3, and is interconnected with the crankshaft 46 and flow control shaft 102 as indicated. The adjusting mechanism is shown in a neutral position in FIG. 16.

It will be noted from an inspection of FIGS. 14 and 15 of the drawings that when the fuel-air mixture scavenging process begins, the air scavenging process stops. In other words, as seen in FIG. 14, opening 108 has just moved out of communication with the bore through flange 94 to stop the flow of air from manifold 56 to the inlet port means, while as seen in FIG. 15, opening 110 is about to be in communication with the bore through flange 96 which enables fuel-air mixture to flow from manifold 60 to the inlet port means.

Referring now to FIGS. 17-21, the adjusting mechanism shown in FIG. 21 has been moved to advance the timing of the flow control means as shown in FIGS. 18-20. This causes the air scavenging process as indicated by sector 3 in FIG. 17 to decrease as compared to FIG. 9, while the duration of the fuel-air mixture scavenging process as indicated by sector 4 in FIG. 17 is increased as compared to FIG. 9. Accordingly, more fuel is introduced into the cylinder, thereby increasing the speed and torque of the engine.

Referring now to FIGS. 22-26, the adjusting mechanism shown in FIG. 26 has been moved to retard the timing of the flow control means as shown in FIGS. 23-25. This causes the fuel-air mixture scavenging process as indicated by sector 4 in FIG. 22 to decrease as compared to FIG. 9, while the duration of the air scavenging process as indicated by sector 3 in FIG. 22 is increased as compared to FIG. 9. Accordingly, less fuel is introduced into the cylinder thereby decreasing the speed and torque of the engine.

One complete cycle of operation of the engine shown in FIGS. 7 and 8 will now be described. It is assumed that piston 42 starts at the bottom dead center position as shown in FIG. 7 where the air scavenging continues and the fuel-air mixture scavenging has not yet begun as shown in FIG. 9. After the piston moves upward a short distance corresponding to the point D in FIG. 9, the flow control means 72 shifts from air scavenging to fuel-air mixture scavenging upon further counter-clockwise rotation of body 100 as seen in FIGS. 14 and 15.

As the piston moves further upward, exhaust port means 80 are closed first while the inlet port means are still open. Accordingly, fuel-air mixture continues to enter the cylinder after exhaust port means 80 are closed until inlet port means 70 are closed. At the beginning of the compression process, the pressure within the cylinder is equal to that within means 54 since the exhaust port means are closed first. This pressure is much greater than atmospheric pressure, and if valve means 86 is moved toward closed position, the pressure further increases within the cylinder at the beginning of the compression process.

At steady engine speed, the air flow through the compressor means and the cylinder is constant. The engine speed and torque is controlled by the flow control means 72 to vary the duration of the fuel-air mixture scavenging process. At top dead center, the piston uncovers passage 76 which enables the residual fuel-air mixture trapped within the intermediate space between the inlet port means and valve means 74 to be automatically purged back to the compression space by compressed air from the flow control means.

The head of the piston is shaped so as to guide the path of the loop-scavenge when the piston is at bottom dead center position, and divides the combustion chamber into two parts, A and B when the piston is at top dead center position as seen in FIG. 8. Part A contains mostly air, and part B contains a rich fuel-air mixture. A highly stratified charge is created within the combustion chamber. The spark plug located in part B of the combustion chamber initiates combustion.

After passing top dead center, the piston is pushed down by the expanding hot gas to begin the expansion process. The one-way valve means 74 prevents the hot gas from entering means 54 and extends the expansion process beyond the opening of inlet port means 70 until the outlet port means 80 is uncovered by the downwardly moving piston to begin the blowdown period. When the pressure within the cylinder drops to less than the pressure within means 54, valve means 74 opens and the air scavenging process begins. When the piston again reaches bottom dead center, the engine cycle is completed.

Since the crankcase compressor is functionally isolated from the cylinders of the engine, it is an independent reciprocating compressor and can be designed to deliver the required volume at a specified discharge pressure just like any other compressor. Accordingly, there is more freedom in choosing the port means heights on the cylinder wall, the scavenging duration and scavenging ratio. For better performance, the clearance volume within the crankcase may be kept to a minimum by filling the void space, i.e. that space not occupied by the crankshaft and connecting rod as the crankshaft turns, with a suitable low density material.

In a multi-cylinder engine, all of the compression spaces are connected with a common reservoir means which in turn maintains a substantially constant scavenging pressure. The reservoir means also reduces the peak pressure within each compression space to decrease the compression work. By maintaining a constant cylinder pressure at the beginning of compression and varying the amount of fuel-air mixture entering the cylinder for speed and torque control, combustion always starts at the same high pressure.

The cycle efficiency increases because of the chemical reactions involved tend to be more complete as the pressure increases. At light load condition, the air per cycle is the same and only the amount of fuel is reduced. When the overall fuel-air ratio is very low, the medium consists substantially of air throughout the cycle, and the efficiency of the fuel-air cycle approaches the much higher efficiency of the air cycle. Therefore, the thermal efficiency at partial load is greatly improved.

For a short duration of extra high power demand, the valve means 86 can be used to increase the exhaust manifold pressure and the pressure within the cylinder. The demand for extra power can be met by increasing the fuel-air mixture admitted to the cylinder. The valve means 86 may also be used to increase the compression temperature and pressure for easy starting.

In an engine employing fuel injection means, means 54 is connected directly to a single intake manifold which is in communication with the inlet port means through the one-way valve means 74. The flow control means 72 is eliminated in such an arrangement. The control means in such an arrangement may employ conventional control means for controlling the operation of the fuel injection system of the engine.

Referring now to FIGS. 27-32, a modified form of the invention is illustrated wherein a cylinder block 120 includes a cylinder 122 which may be similar to the cylinders of the previously described forms of the invention Only the lower portion of this form of the invention is shown, the piston and connecting rod being eliminated for the sake of clarity. It should be understood that the upper portion of the engine in these figures may be substantially the same as in the previous forms of the invention. The exterior passage means is similar to those described in connection with the foregoing embodiments and is connected with the outlet valve means of the compressor. The cylinder block includes a flange 124 to which the crankcase 126 is attached by a flange 128 which is suitably connected and sealed to flange 124 as by nut and bolt assemblies and gasket means (not shown) of conventional construction.

An inner crankcase indicated generally by reference numeral 130 is disposed adjacent the lower end of the cylinder and includes an upper portion 132 suitably connected to and sealed with respect to the cylinder block by nut and bolt assemblies and gasket means (not shown). The inner crankcase also includes a lower portion 134 connected to the upper portion by flanges 136 and 138 on the upper and lower portions respectively, these flanges also having suitable nut and bolt assemblies (not shown) passing therethrough. The inner crankcase has a hollow interior and defines an upper compression area between the inner crankcase and the piston, as well as a lower compression area within the hollow interior of the inner crankcase.

The piston (not shown) which is slidably disposed within cylinder 122 is of conventional construction similar to piston 42 as shown in FIG. 7 and includes a peripheral depending skirt defining a recess under the piston. The inner crankcase includes a portion 140 of generally cylindrical outer configuration which extends upwardly with the recess under the piston when the piston is in bottom dead center position. Portion 140 has a minimum clearance with respect to the inner surface of the skirt and the undersurface of the piston.

Portion 140 also has an opening 142 formed therethrough in communication with the hollow interior of the inner crankcase for receiving the connecting rod (not shown). Opening 142 is in the form of a narrow tapered slot so as to accommodate all operating positions of the connecting rod with a minimum of clearance. As seen in FIG. 27, the crankshaft 146 includes a crankpin bearing portion 148 to which the connecting rod is connected. As the crankshaft rotates, the connecting rod will move laterally as seen in this figure, and the tapered sides of slot 142 allow such movement of the connecting rod with a minimum of clearance. The sides of slot 142 as seen in FIG. 28 provide a minimum of clearance with opposite adjacent sides of the connecting rod.

As further seen in FIG. 28, a first drain means in the form of two passages 150 and 152 are formed in the inner crankcase. These drain passages serve to provide communication between the upper and lower compression areas so that any oil which may accumulate in the upper compression area may drain downwardly into the lower compression area.

The crankshaft is provided with a pair of spaced crank cheeks 154 and 156 which are of disc-like configuration, the crankpin bearing portion 148 being disposed between the cheeks. These crank cheeks may be formed by filling in the usual void space in a conventional crankshaft with suitable low density material. As seen in FIG. 27, portions 132 and 134 of the inner crankcase have curved inner surfaces 133 and 135 respectively which conform to the shape of the crank cheeks and have a minimum clearance therewith. As seen in FIG. 28, the side walls 160 and 162 of the inner crankcase are disposed adjacent the outer faces of crank cheeks 154 and 156 respectively and have a minimum clearance therewith.

It is apparent from the foregoing description that the hollow interior of the inner crankcase has a shape which conforms to the shape of the crankshaft to minimize the clearance between the inner surface of the inner crankcase and the crankshaft. This feature combined with portion 140 ensures that the clearance volume of the compressor is reduced to a minimum, thereby increasing the efficiency of operation thereof.

The inner crankcase has a passage 170 formed therein which opens at a point 172 exterior of the main crankcase and which is in communication with ambient air. A first one-way valve 174 is schematically illustrated and is mounted in passage 170 adjacent point 172 and serves to allow ambient air to flow into the lower compression area within the inner crankcase, but allows substantially no air flow from the compression space back into ambient air. The inner crankcase also has a passage 176 formed therein which opens at a point 178 exterior of the main crankcase and which is in communication with exterior passage means similar to those described in connection with the previous embodiments of the invention. A second one-way valve 180 is schematically illustrated and is mounted in passage 176 adjacent point 178 and serves to allow compressed air to flow from the lower compression area into an associated exterior passage means and allows substantially no flow of compressed air back into the lower compression area. Each of the one-way valve means may comprises conventional reed valves or the like.

A drain opening 184 is formed at the lower portion of the inner crankcase. A tubular fitting 186 has a passageway formed therethrough in communication with opening 184. The inner crankcase is spaced from the main crankcase to define a gap G therebetween. The drain means defined by the drain opening and the tubular fitting provides communication between the lower compression space and the gap for draining oil from the lower compression space into the gap. Any lubrication oil disposed within the bottom of the inner crankcase is forced out through the drain means by a small amount of compressed air.

Referring now to FIGS. 30 and 31, a forced lubrication means is provided for the crankpin bearings of the crankshaft 146 which has an oil passage 200 formed therein connected with a suitable pump means to provide oil under pressure to the bearing means associated with the crankshaft. Oil passage 200 provides oil to the interior of the crankpin bearing housing 202 at the lower end of a connecting rod 203. Passage 200 is in communication with a further passage 204 for carrying oil to additional crankpin bearing housings.

Recesses are formed at opposite ends of the crankpin bearing housing which receive annular open oil rings 206 and 208 respectively. The oil rings 206 and 208 are held in place by retainer rings 210 and 212 respectively. The opposite ends of each of the oil rings are spaced from one another, and as seen in FIG. 31, the opposite ends 208' of oil ring 208 are spaced to define an opening therebetween to direct lubricating oil to the bottom of the inner crankcase. The opposite ends of each of the retainer rings are also spaced from one another, and as seen in FIG. 31, the opposite ends 212' of retainer ring 212 are spaced to define an opening therebetween to direct lubricating oil to the bottom of the inner crankcase. It is understood that lubricating oil will leak out from the opposite ends of the crankpin bearing during operation of the engine.

The lubricating means discussed above permits the use of regular bearings for the crankpin and the crankshaft rather than needle bearings. These regular bearings can be force lubricated without unduly contaminating the compressed air with lubrication oil since the oil leaking out of the crankpin bearing is directed downwardly into the bottom of the inner crankcase and drained outwardly thereof into the main crankcase.

Referring now to FIGS. 32-35, a further form of the invention is illustrated which is similar in some respects to the embodiment shown in FIGS. 27-29; and accordingly, similar parts have been given the same reference numerals primed. In this form of the invention, an inner crankcase is also employed, but the side walls of the inner crankcase are modified to provide an improved valve means associated with the compressor of the engine. The side wall 162' is thicker than the side wall 162 of the previous embodiment and is provided with a passage 220 which is in communication with a conduit 222 which is part of an exterior passage means similar to those previously described. An opening 224 in the inner surface of the side wall 162' is in communication with passage 222 and extends through an arc of a circle having its center of rotation on the axis of rotation of the crankshaft. The opening 224 extends through an arc somewhat greater than 90° as seen in dotted lines in FIG. 34.

Crank cheek 156' is provided with an opening 226 therethrough which also extends through an arc of a circle having its center of rotation on the axis of rotation of the crankshaft. Opening 226 extends through an arc of about 30° and is adapted to register with opening 224 for a certain period of time as the crank cheek rotates in the direction of the arrow with respect to the side wall of the inner crankcase.

The side wall 160' is thicker than the side wall 160 of the previous embodiment and is provided with a passage 230 which is in communication with a conduit 232 which is in communication with ambient air. An opening 234 in the inner surface of the side wall 160' is in communication with passage 232 and extends through an arc of a circle having its center of rotation on the axis of rotation of the crankshaft. The opening 234 extends through an arc somewhat greater than 90° as seen in dotted lines in FIG. 35.

Crank cheek 154' is provided with an opening 236 therethrough which also extends through an arc of a circle having its center of rotation on the axis of rotation of the crankshaft. Opening 236 extends through an arc of about 30° and is adapted to register with opening 234 for a certain period of time as the crank cheek rotates in the direction of the arrow with respect to the side wall of the inner crankcase.

The crank cheeks 154' and 156' have a small clearance with respect to the inner surfaces of the adjacent side walls 160' and 162' respectively so that oil flowing downwardly through passages 150' and 152' will provide an air-tight seal between the crank cheeks and the inner crankcase. The openings 224 and 226 which periodically register with one another during operation of the engine form one of the valve means associated with the compressor; and the openings 234 and 236 which also periodically register with one another during operation of the engine form the other valve means associated with the compressor.

The operation of these valve means will now be described. Starting at the bottom dead center position of the piston as indicated by the crankpin bearing portion 148 in FIG. 35, as the piston (not shown) moves upwardly, it creates a negative pressure within the inner crankcase. When opening 236 registers with opening 234, ambient air flows into the hollow interior of the inner crankcase and into the cylinder below the piston. When the piston reaches top dead center position, opening 236 is no longer in register with opening 234. During this phase of operation of the engine, the openings 224 and 226 are not in register with one another.

Referring now to FIG. 34, as the piston starts to move downwardly from its top dead center position, a positive pressure is created which compresses the air and opening 226 will have moved in the direction of the arrow about 180° from the position shown. When the openings 224 and 226 are initially in register with one another, the pressure within the hollow interior of the inner crankcase is already higher than that within an exterior passage means or a reservoir connected therewith so that the compressed air will flow outwardly of the inner crankcase through openings 224 and 226 into the exterior passage means and any associated reservoir means. The compressed air will flow out of the inner crankcase until the piston reaches bottom dead center position when the openings 224 and 226 are no longer in register with one another, and the valve means are adapted to move through another cycle of operation similar to that discussed above.

It is apparent from the foregoing discussion that the valve means formed by openings 234 and 236 enable ambient air to flow into the compression space, but substantially no air may flow from the compression space into ambient air. In addition, the valve means formed by openings 224 and 226 enable compressed air to flow into an exterior passage means, but substantially no compressed air may flow from the passage means back into the compression space. The openings 224, 226 are in register at different points in time than the openings 234, 236. Accordingly, the compression process within the compression space is substantially independent of the processes occurring in the combustion space.

Referring now to FIGS. 36-44, a modified control means is illustrated which can replace the flow control means 72 as shown for example in FIGS. 7 and 8 of the drawings. As seen particularly in FIGS. 36 and 37, a hollow generally cylindrical body means 240 includes three separate members 242, 244 and 246 connected to one another by suitable means such as nut and bolt assemblies (not shown). Members 242, 244 and 246 have bores 250, 252 and 254 formed therethrough respectively to provide a hollow structure.

Member 244 has a first flange 260 formed thereon and an inner projecting portion 262, a bore 264 being formed through flange 260 and portion 262. Bore 264 is connected directly to the inlet port means of an associated cylinder of the engine, and the one-way valve 74 such as employed in FIG. 7 can be eliminated when the modified control means is utilized. A second flange 266 has a bore 268 formed therethrough which is in communication with a space 270 formed in the wall of the body means. Bore 268 is connected to a first passage means connected directly to a reservoir means to provide compressed air to the combustion space. A third flange 272 has a bore 274 formed therethrough which is in communication with a space 276 formed in the wall of the body means. Bore 274 is connected to a second passage means includes carburetor means for providing a fuel-air mixture to the combustion space.

An annular control means 280 includes three members 282, 284 and 286 suitably connected to one another as by countersunk nut and bolt assemblies (not shown). Members 282 and 286 include tubular portions 283 and 287 respectively of reduced dimension to fit within bores 250 and 254 of body means 240, the tubular portions receiving portions of a rotating control means hereinafter described. The annular control means is mounted within the hollow body means 240 for limited rotational movement with respect thereto, and member 284 includes three openings 290, 292 and 294 spaced circumferentially from one another and extending vertically thereof. The first opening 290 extends through an arc of approximately 90° and is always in communication with bore 264. The second opening 292 extends through a much smaller arc and is always in communication with bore 268. The third opening 294 extends through an arc similar to that of opening 292 and is always in communication with bore 274.

A rotating control means 300 includes a substantially cylindrical central portion 302 which is rotatably positioned within member 284 previously described. Rotating control means 300 also includes a pair of substantially cylindrical portions 304 and 306 extending from opposite sides thereof and which are rotatably supported within the previously described tubular portions 283 and 287 respectively. As seen in FIG. 41, portion 302 has a central substantially cylindrical cavity 310 formed therein which is in communication with openings 312 and 314. It is noted that opening 314 has a substantially greater circumferential dimension than opening 312.

Referring now to FIGS. 42–45, the components shown in FIGS. 36–41 are illustrated in assembled position. As seen in FIGS. 42–45, the rotating control means is suitably connected with the crankshaft so as to continuously rotate such that substantially cylindrical portion 302 rotates in the direction of the arrows in these figures. Member 284 of the annular control means is shown at one limit of movement in FIGS. 43 and 44, and is shown at the opposite limit of movement in FIG. 45.

FIG. 42 is a crank angle diagram showing the angles at which various engine cycle events take place. The inlet port opening is indicated at I.O., and the inlet port closing is indicated at I.C. The exhaust port opening is indicated at E.O., and the exhaust port closing is indicated at E.C. It is noted that the points I.O. and I.C. are symmetrical with respect to the bottom dead center position of the piston as indicated at BDC. The points E.O. and E.C. are also symmetrical with respect to the bottom dead center position. C.O. represents the crank angle at which the flow control means 300 begins to provide communication with the bore 264 and the inlet port means of the engine. This position corresponds to the position of the substantially cylindrical portion 302 of the rotating flow control means as shown in FIG. 43. As seen in FIG. 43, opening 314 is being brought into communication with bore 264. The angle between E.O. and C.O. is the usual blowdown period.

As member 302 moves counterclockwise from the position shown in FIG. 43 to that shown in FIG. 44, air scavenging begins as opening 312 in member 302 is aligned with opening 292 in the annular control member and opening 314 is aligned with bore 264. As member 302 moves further in a counterclockwise direction, opening 312 will align with opening 294, and as seen in FIG. 44, both air scavenging and fuel-air mixture scavenging will occur for a period of time. As member 302 moves still further in a counterclockwise direction, opening 312 will no longer be aligned with opening 292, and air scavenging will cease. As member 302 continues to move in a counterclockwise direction, fuel-air mixture scavenging will cease either by opening 312 no longer being aligned with opening 294 or by closing of the inlet ports, whichever occurs earlier in time.

Referring now to FIG. 45, the annular control means including member 284 has been moved to its opposite limit position. In this position, the air scavenging duration is increased and the fuel-air mixture scavenging duration is reduced as compared to the position of the annular control means shown in FIGS. 43 and 44. It is evident that the annular control means can be moved to other positions intermediate the two limit positions to vary the duration of the air scavenging and fuel-air mixture scavenging processes to thereby control the engine speed or torque.

It will be understood that in a multiple cylinder engine, one control means as shown in FIGS. 35-41 will be associated with each of the cylinders. All of the rotating control means 300 will be connected to the crankshaft for rotation together by the crankshaft. All of the annular control means 280 will also be connected for operation together by a suitable means such as a foot pedal for controlling the speed or torque of the engine.

Referring now to FIG. 46, a vertical sectional view is shown through the centerline of a four-cycle diesel engine looking toward the discharge side of the compressor. The compressor portion of this modification is identical with the construction shown in FIGS. 32-35, and corresponding parts have been given the same reference numerals. The cylinder block includes a hollow cylinder 320 having a piston slidably disposed therein. A connecting rod 324 connects the piston to the portion 148' of the crankshaft in the usual manner.

An inlet port 330 is provided in the cylinder head, and a conventional inlet valve 332 serves to open and close the inlet port. An inlet passage 334 formed in the cylinder head is in communication with the inlet port. An outlet port 340 is provided in the cylinder head, and a conventional outlet valve 342 serves to open and close the outlet port. An outlet passage 344 formed in the cylinder head is in communication with the outlet port. A conventional fuel injector in the form of a high pressure fuel nozzle 346 is provided for providing diesel fuel to the combustion space of the engine.

The conduit 222 provides compressed air to an exterior passage means 350 having a reservoir means 352 therein. The passage means is connected to an intake manifold 354 which is in communication with the inlet passage 334.

For each suction stroke of the engine, there are two suction strokes of the compressor. The compressed air from the compressor is stored in the reservoir means which maintains the desired pressure to be provided to the combustion space of the engine.

Only a single cylinder is shown in FIG. 46, but it is understood that a multi-cylinder diesel engine may also be employed. As is the case in all multi-cylinder engines, all of the compression spaces are hermetically sealed with respect to one another, and all compression spaces are connected to a common reservoir means.

It is further noted that the invention may be employed in connection with other types of four-cycle engines such as gasoline fueled engines employing low pressure fuel injectors or carburetors.

The compressor of the invention can be used as a supercharger for a four-stroke engine, since its capacity is almost twice that of the cylinder displacement of the engine. Compared with a separate supercharger, the new crankcase compressor is not only simpler and lighter, but also reduces engine mechanical friction which is proportional to the engine means effective pressure. In the case of a diesel engine, there is no detonation limit to the compression ratio the new compressor can offer a substantial advantage to a diesel engine in comparison with a spark-ignition engine.

The invention has been described with reference to preferred embodiments. Obviously, modifications, alterations and other embodiments will occur to others upon reading and understanding this specification. It is my intention to include all such modifications, alterations and alternate embodiments insofar as they come within the scope of the appended claims or the equivalent thereof.

What is claimed is:

1. An internal combustion engine, comprising a cylinder block having a crankcase and a cylinder including a cylinder wall, inlet port means in communication with said cylinder and comprising port means formed in said cylinder wall, outlet port means in communication with said cylinder, a crank shaft journalled in said crankcase, a piston mounted for reciprocation within said cylinder, a connecting rod connecting said piston with said crankshaft, said piston cooperating with said cylinder to define an expansible/compressible combustion space above said piston, said piston forming the top of a compression space below said piston, passage means exterior of said cylinder block for transferring compressed air from said compression space to said combustion space through said inlet port means, first valve means through which ambient air flows into said compression space and through which substantially no air flows from said compression space into ambient air, second valve means through which compressed air flows from said compression space into said passage means and through which substantially no compressed air flows from said passage means into said compression space whereby the compression process within said compression space is substantially independent of the processes occurring in said combustion space, exhaust means connected with said outlet port means for exhausting said combustion space, means for creating a combustible fuel-air mixture in said combustion space, means causing ignition of the fuel-air mixture in said combustion space, and control means for controlling the speed and torque of the engine, said passage means comprising first passage means for supplying air to said combustion space and second passage means for supplying fuel-air mixture to said combustion space, said control means comprising flow control means for connecting and disconnecting said inlet port means with said first and second passage means.

2. An internal combustion engine comprising a cylinder block having a crankcase and a cylinder, said cylinder having a hollow interior, a piston mounted for reciprocation within the interior of said cylinder, inlet port means in communication with the interior of said cylinder, outlet port means in communication with the interior of said cylinder, a crankshaft mounted for rotation about an axis of rotation within said crankcase, a connecting rod connecting said piston with said crankshaft, said piston cooperating with said cylinder to define a combustion space above said piston, said piston forming the top of a compression space below said piston, passage means exterior of said cylinder block for transferring compressed air from said compression space to said combustion space through said inlet port means, first valve means through which ambient air flows into said compression space and through which substantially no air flows from said compression space into ambient air, second valve means through which compressed air flows from said compression space into said passage means and through which substantially no compressed air flows from said passage means into said compression space, whereby the compression process within said compression space is substantially independent of the processes occurring in said combustion space, an inner crankcase supported within said crankcase, said inner crankcase having a hollow interior and defining an upper compression area between said inner crankcase and said piston and a lower compression area within said hollow interior, said inner crankcase having an opening therein receiving said connecting rod, exhaust means connected with said outlet port means for exhausting said combustion space, means for creating a combustible fuel-air mixture in said combustion space, means causing ignition of the fuel-air mixture in said combustion space, and control means for controlling the speed and torque of the engine.

3. An engine as defined in claim 2 wherein said inner crankcase is disposed adjacent the lower end of said cylinder.

4. An engine as defined in claim 2 wherein said piston is provided with a peripheral depending skirt defining a recess under said piston, said inner crankcase including a portion extending upwardly within said recess when the piston is in bottom dead center position.

5. An engine as defined in claim 2 wherein said first and second valve means are in communication with said lower compression area.

6. An engine as defined in claim 2 wherein the shape of the hollow interior of said inner crankcase conforms to the shape of said crankshaft to minimize the clearance between the inner surface of the inner crankcase and said crankshaft.

7. An engine as defined in claim 2 including drain means providing communication between said upper and lower compression areas for draining oil from said upper compression area into said lower compression area.

8. An engine as defined in claim 2 wherein said inner crankcase is spaced from said crankcase and defines a gap therebetween, and drain means providing communication between said lower compression space and said gap for draining oil from said lower compression area into said gap.

9. An engine as defined in claim 8 wherein said crankshaft includes a crankpin bearing, lubricating means for force lubricating said bearing, said lubricating means including oil ring means, and retainer means for retaining said oil ring means in position, said oil ring means and said retainer means including openings in the lower portions thereof to direct lubricating oil to the bottom of said inner crankcase.

10. An engine as defined in claim 2 wherein said inner crankcase includes a pair of spaced openings therein which are in communication with ambient air and said passage means respectively, said crankshaft including portions defining a pair of spaced openings therein, said portions and the pair of openings therein being movable with respect to the pair of openings in said inner crankcase and cooperating therewith to define said first and second valve means.

11. An engine as defined in claim 2 wherein said inner crankcase includes a first wall having a first opening in communication with ambient air, said inner crankcase including a second wall having a second opening in communication with said passage means, said crankshaft including a pair of spaced crank plates disposed between said first and second side walls, one of said crank plates being disposed adjacent said first wall and having a third opening therein, the other of said crank plates being disposed adjacent said second side wall and having a fourth opening therein, said crank plates being rotatable with respect to said first and second walls so that said first and third openings periodically register with one another to define said first valve means, and said second and fourth openings periodically register with one another to define said second valve means.

12. An engine as defined in claim 11 wherein each of said openings extends through an arc of a circle having its center on the axis of rotation of said crankshaft.

13. An engine as defined in claim 12 wherein said first and second openings extend through a substantially greater arc than said third and fourth openings.

14. An engine as defined in claim 11 wherein said openings are arranged such that said first and third openings are in register with one another at different points in time than when said second and fourth openings are in register with one another.

15. An engine as defined in claim 11 wherein said first and third openings are in register with one another when the piston is moving up thereby creating a negative pressure within said compression space, and said second and fourth openings are in register with one another when the piston is moving down thereby creating a positive pressure within said compression space.

16. An engine as defined in claim 14 including a plurality of inner crankcases supported within said crankcase with each of said inner crankcases being associated with one of said cylinders, each of said inner crankcases having a hollow interior and defining an upper compression area between said inner crankcase and the associated piston and a lower compression area within the hollow interior of the inner crankcase, each of said inner crankcases having an opening therein receiving an associated connecting rod.

17. An engine as defined in claim 16 wherein each of said pistons is provided with a peripheral depending skirt defining a recess under the piston, each of said inner crankcases including a portion extending upwardly within the recess of the associated piston when the piston is in bottom dead center position.

18. An engine as defined in claim 16 wherein each of said inner crankcases is spaced from said crankcase and defines a gap therebetween, and drain means providing communication between each of said lower compression spaces and the associated gap for draining oil from each lower compression area into the associated gap.

19. An engine as defined in claim 16 wherein each of said first and second valve means are one-way valves.

20. An engine as defined in claim 16 wherein each of said inner crankcases includes a pair of spaced openings therein which are in communication with ambient air and said passage means respectively, said crankshaft including portions associated with each inner crankcase and defining a pair of spaced openings therein, each of said portions and the pair of openings therein being movable with respect to the pair of openings in an associated inner crankcase and cooperating therewith to define the associated first and second valve means.

* * * * *